United States Patent [19]

Ishii et al.

[11] 4,449,175

[45] May 15, 1984

[54] SWITCHING REGULATOR

[75] Inventors: Masanori Ishii, Kawagoe; Hiroichi Ishikawa, Kawaguchi, both of Japan

[73] Assignee: Toko, Inc., Tokyo, Japan

[21] Appl. No.: 371,264

[22] Filed: Apr. 23, 1982

[30] Foreign Application Priority Data

Apr. 28, 1981 [JP] Japan .................................. 56-64789

[51] Int. Cl.³ .......................................... H02M 3/335
[52] U.S. Cl. ...................................... 363/26; 363/41; 363/56; 363/79
[58] Field of Search ...................... 363/26, 41, 55–57, 363/79, 97

[56] References Cited

U.S. PATENT DOCUMENTS

| 4,030,019 | 6/1977 | Bailey | 363/57 |
| 4,063,306 | 12/1977 | Perkins et al. | 363/56 X |
| 4,148,097 | 4/1979 | Deisch | 363/26 |
| 4,150,424 | 4/1979 | Neuchterlein | 363/56 X |
| 4,270,164 | 5/1981 | Wyman et al. | 363/56 |
| 4,344,124 | 8/1982 | Panicali | 363/26 X |
| 4,371,824 | 2/1983 | Gritter | 363/56 X |

Primary Examiner—William M. Shoop

[57] ABSTRACT

In a switching regulator including a pulse-width modulator for controlling the pulse width of a base input applied to a pair of transistors which are alternately turned on and off by the base input, the pulse-width modulator is provided, by an error amplifier, with an input corresponding to the magnitude of a detected output voltage, and variations in the input applied to the pulse-width modulator for increasing the pulse-width of the aforementioned base input are moderated by means of a time-constant circuit and a circuit for causing the time-constant circuit to be charged and discharged.

3 Claims, 6 Drawing Figures

SWITCHING REGULATOR

The present invention relates to a switching regulator wherein pulse-width control is effected by alternately rendering a pair of switching transistors conductive, and more particularly it pertains to such a switching regulator which includes means for preventing the transistors from tending to be damaged when a rapidly increasing load is imparted thereto.

In order to have a better understanding of the present invention, description will first be made with reference to FIG. 1 which is a circuit diagram illustrating a typical example of switching regulator of the type to which the present invention relates. The illustrated switching regulator includes a pair of transistors Q1 and Q2 serving as switching transistors, which are adapted to be alternately turned on and off so that a DC voltage obtained from a commercial power source 1 through a filter 2 and rectifying-smoothing circuit 3 is applied to a primary winding L11 of a main transformer T1 to cause currents in opposite directions to be alternately flown therethrough. In this way, AC voltages will be induced in secondary windings L12 and L13 of the transformer T1, the AC voltages thus induced depending on the ratio of the number of turns of the secondary winding L12 to that of the primary winding L11 and the ratio of the number of turns of the secondary winding L13 to that of the primary winding L11, respectively. Subsequently, the AC voltages will be rectified by means of diodes D1 and D2 and then smoothed out by means of a choke coil CL and an electrolytic capacitor C1, so that a DC output voltage $V_{OUT}$ will be obtained across output terminals 7 and 7'. The detected output voltage will be compared in an error amplifier A22 with the voltage of a reference power source E1 so that an error signal such as shown at (b) in FIG. 2 will be provided. The error signal will in turn be compared in a comparator C of a pulse-width modulator 4 with a saw-tooth wave signal, such as shown at (a) in FIG. 2, which is derived from an oscillator OS. Through the operation of an NOR circuit NOR in synchronism with a signal provided by a flip-flop circuit F, drive transistors Q3 and Q4 connected to the primary winding of a drive transformer T2 will be alternately rendered conductive for a period of time during which the saw-tooth wave signal exceeds the error signal. By virtue of the fact that the pair of transistors Q1 and Q2 connected to the secondary windings of the transformer T2 are alternately turned on or off like the transistors connected to the primary winding of the transformer T2, pulse-width control will be effected so that the output voltage $V_{OUT}$ will be maintained at a predetermined level.

The error amplifier A11 is adapted to detect an overcurrent and provide a protection thereagainst and connected in the form of an OR circuit to an error amplifier A22. Indicated at E2 is an auxiliary power source.

However, the aforementioned switching regulator is disadvantageous in that there is the tendency that for a rapidly increasing load, one or both of the transistors Q1 and Q2 are liable to be damaged by an over-current which tends to be caused to flow therethrough due to magnetic saturation occurring in the core of the main transformer. The section between points of time t1 and t3 in FIG. 2 represents a condition prevailing when such magnetic saturation has occurred.

In FIG. 2, a voltage waveform occurring at a point P2 in the pulse-width modulator 4 is shown at (c); a collector current waveform of the drive transistor Q3 is shown at (d); a collector current waveform of the drive transistor Q4 is shown at (e); a current waveform flowing through the primary winding L11 of the main transformer T1 is shown at (f); and a magnetic flux density in the core of the main transformer T1 is shown at (g). The abscissa represents time t.

Assume that the load is rapidly increased at the point of time t1 so that the voltage derived from the error amplifier A22 becomes lower. Then, the core of the main transformer T1, which has slightly been magnetized in the negative (−) direction, will immediately begin to be magnetized in the opposite direction, i.e., in the positive (+) direction by a current flowing through the primary winding L11. At a point of time t2, a maximum magnetic flux density $+B_M$ in the positive direction will be attained so that the core will be magnetically saturated, and thereupon the current flowing through the primary winding L11 will rapidly be increased. Thus, a high collector current will be caused to flow through that one of the switching transistors which is in an "ON" state, until the point of time t3 when the transistor is turned off is reached. In general, a main transformer for use with this type of switching regulator is designed so that magnetic flux changes in such a range that magnetic saturation in the positive and negative directions does not occur even with a maximum pulse width, and use is made of switching transistors adapted to meet such design criteria; disadvantageously, however, it often happens that such transistors are damaged by an excessive collector current which is caused to transiently flow therethrough. In order to cope with such a situation, high current capacity type switching transistors and/or a main transformer comprising a core with a high maximum magnetic flux density should be employed. Obviously, this constitutes a drawback from the standpoint of economy and also leads to an increase in the entire size of the switching regulator.

SUMMARY OF THE INVENTION

Accordingly, it is an object of the present invention to provide a novel and improved switching regulator which is so designed as to prevent switching transistors from being damaged without employing transistors with an unnecessarily high current capacity or a main transformer comprising a core with a high maximum magnetic flux density, thereby avoiding the aforementioned drawbacks of the prior art.

Briefly stated, according to the present invention, there is provided a switching regulator wherein a pair of transistors are alternately turned on and off by a base input applied thereto so that a current which is alternately reversed in direction is caused to flow through a primary winding of a main transformer; a voltage induced in a secondary winding of the main transformer is rectified to obtain a DC output; the pulse width of the base input is controlled in accordance with the magnitude of a detected output voltage by means of a pulse-width modulator so that the aforementioned DC output is maintained at a predetermined value; the pulse-width modulator is provided with an input corresponding to the magnitude of the detected output voltage by an error amplifier; and variations in the input provided to the pulse-width modulator to increase the pulse width of the base input are moderated by means of a time-constant circuit.

DESCRIPTION OF THE PREFERRED EMBODIMENTS

Figure 1:
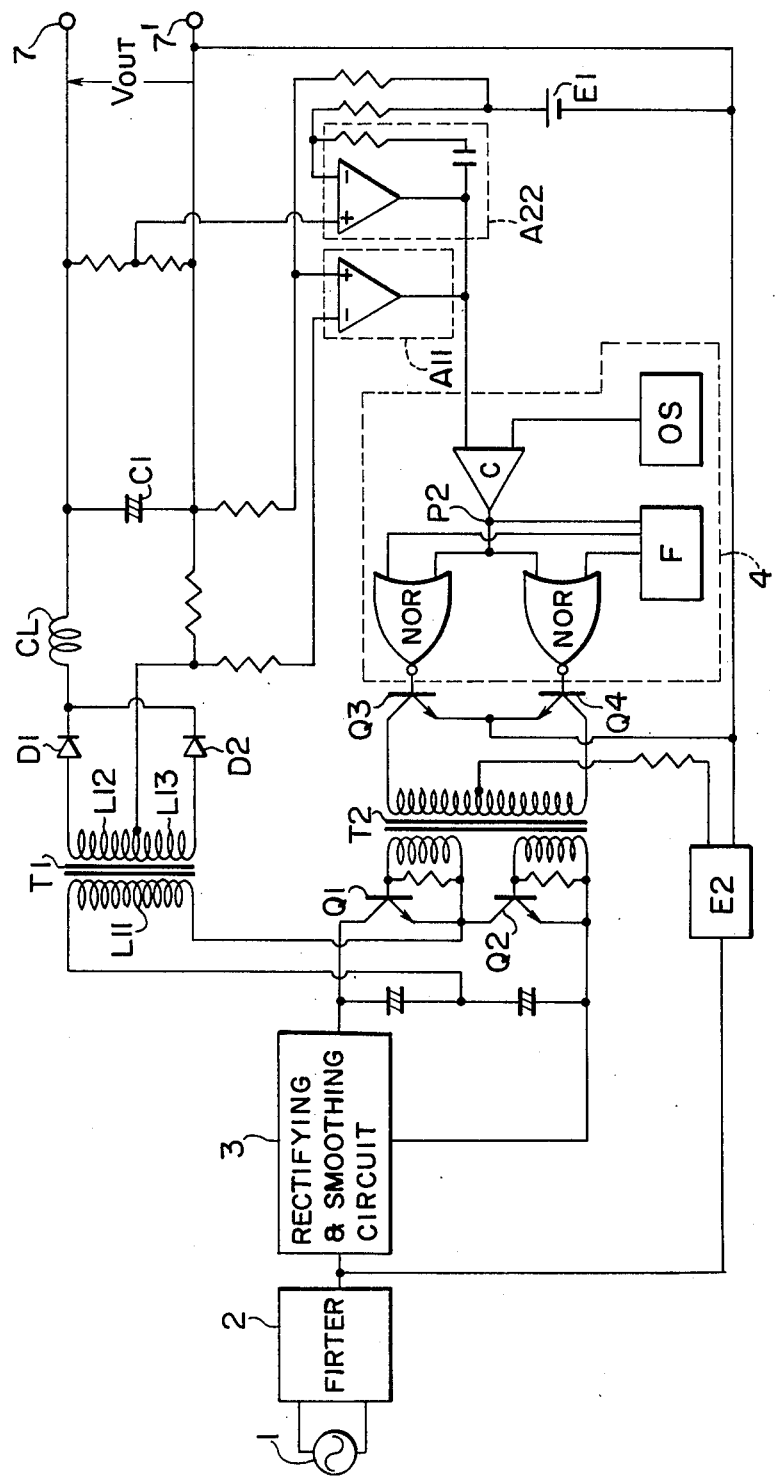
FIG. 1 is a circuit diagram showing the conventional switching regulator.
Figure 3:
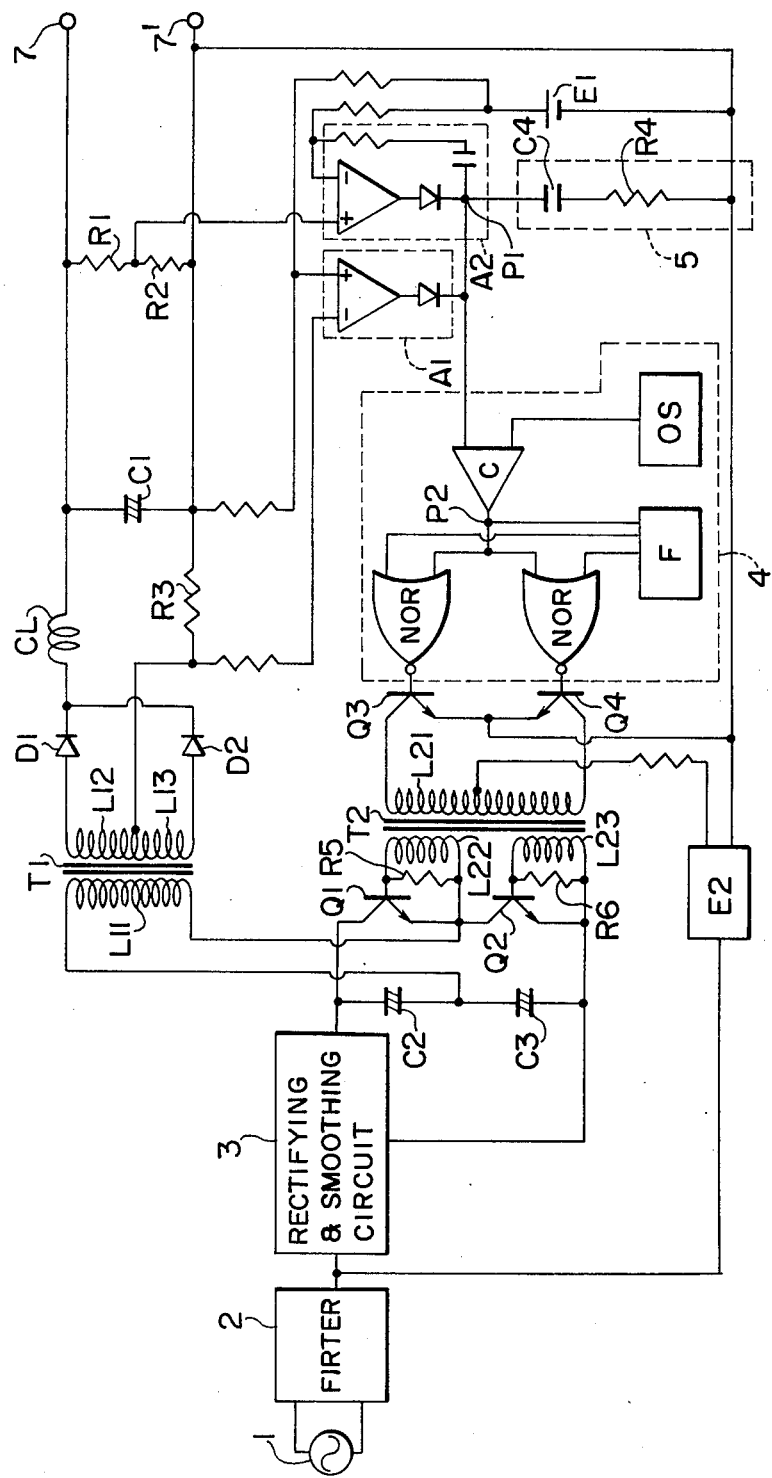
FIG. 3 is a circuit diagram showing the switching regulator according to an embodiment of the present invention.

Referring to FIG. 3 of the drawings, there is shown the switching regulator according to an embodiment of the present invention, wherein parts corresponding to those of FIG. 1 are shown by like reference numerals or symbols.

In the embodiment shown in FIG. 3, a DC voltage which is available from a commercial power source 1 through a filter 2 and rectifying-smoothing circuit 3 is applied across the both terminals of a series circuit comprising electrolytic capacitors C2 and C3, and thence to the collector of a transistor Q1 and the emitter of a transistor Q2, these transistors being adapted to act as switching transistors.

The primary winding L11 of a main transformer has one end thereof connected to the connection point between the capacitors C2 and C3 constituting the aforementioned series circuit, the other end of the primary winding L11 being coupled to the connection point between the emitter of the transistor Q1 and the collector of the transistor Q2. The transistor Q1 has the base and collector thereof connected to each other through a secondary winding L22 of a drive transformer T2, and the transistor Q2 has the base and emitter thereof coupled to each other through another secondary winding L23 of the drive transformer T2. Indicated at R5 and R6 are bias resistors.

The secondary windings L12 and L13 of the main transformer T1 are connected across output terminals 7 and 7' through a rectifying-smoothing circuit. A series connection of resistors R1 and R2 is connected across the output terminals 7 and 7', and the connection point between the resistors R1 and R2 is connected to a positive input terminal of an error amplifier A2, the output of which in turn is connected to an input terminal of a comparator C incorporated in a pulse-width modulator 4. An oscillator OS is connected to another input terminal of the comparator C. The output terminal of the comparator C is connected to the input terminal of a flip-flop circuit F and also to one of two NOR circuits NOR at the input terminal thereof, the output terminals of the flip-flop circuit F being coupled to the two NOR circuits NOR at the other input terminal thereof. The two NOR circuits NOR have their outputs coupled to the bases of the drive transistors Q3 and Q4.

The drive transistors Q3 and Q4 have their emitters coupled to each other and their collectors connected across the primary winding L21 of a drive transformer T2, an intermediate tap of the primary winding L21 and the emitters of the drive transistors Q3 and Q4 being connected to an auxiliary power source E2. An error amplifier A1 serves to provide for a protection when an over-current is detected by means of a resistor R3, and is connected in the form of an OR circuit to another error amplifier A2, so that when the over-current is detected, the error amplifier A1 is operated in preference to the other error amplifier A2. A reference power source E1 is connected, via bias resistors, to the negative input terminal of the error amplifier A2 and the positive input terminal of the error amplifier A1. The output circuit of each of these error amplifiers is constructed in the form of an emitter-follower configuration which is illustrated equivalently as a diode.

Furthermore, the switching regulator embodying the present invention incorporates a time-constant circuit 5 which comprises a series circuit of a capacitor C4 and resistor R4, which is connected at one end to a point P1 corresponding to the output terminal of the error amplifier A2.

Description will now be made of the operation of the switching regulator having the aforementioned construction according to the present invention, with reference to FIGS. 4 to 6.

Figure 4:
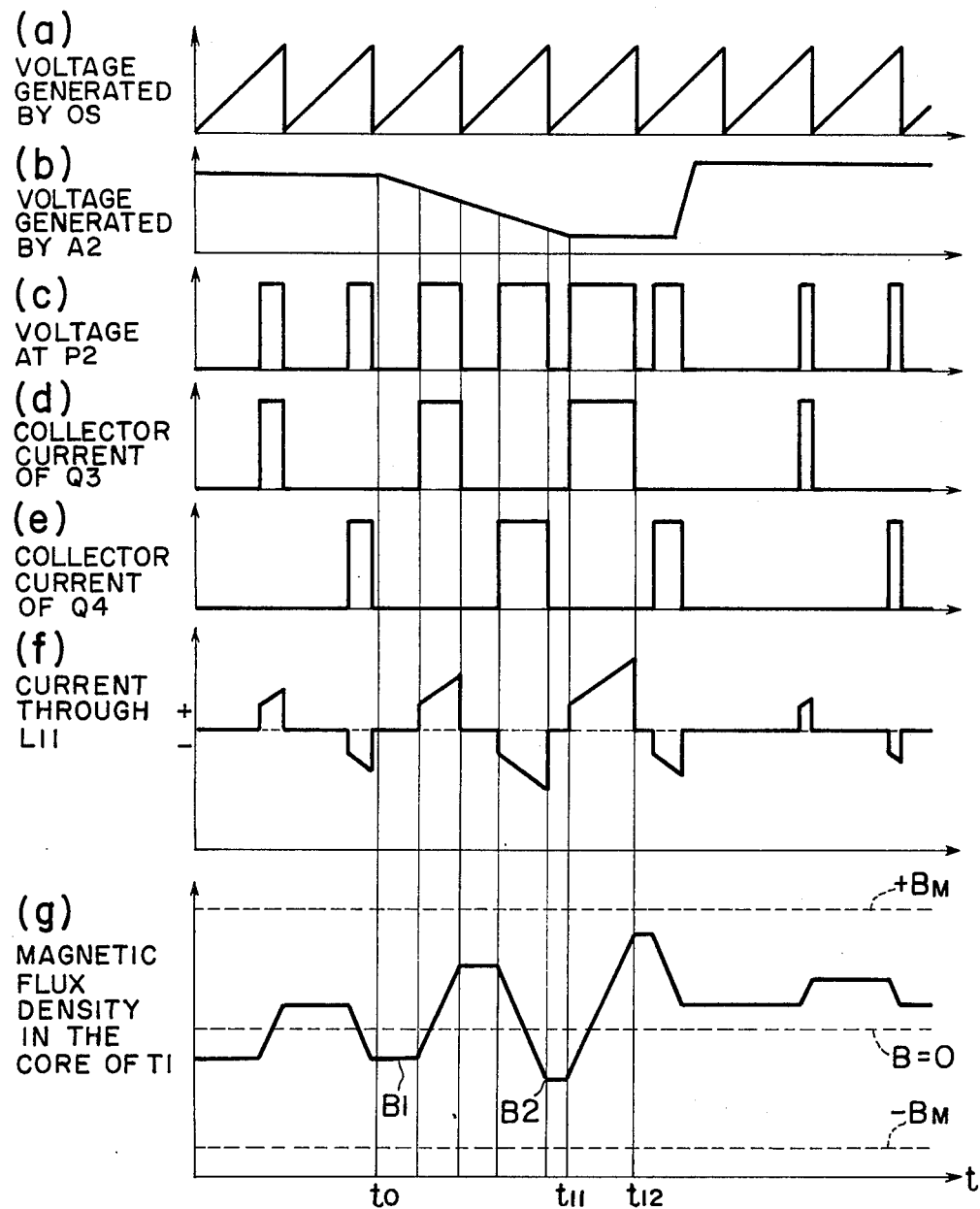
FIG. 4 is a view illustrating operating waveforms occurring at various points in the switching regulator shown in FIG. 3.

FIG. 4 illustrates various operating waveforms which occur in the present switching regulator. More specifically, FIG. 4(a) illustrates a voltage waveform generated by the oscillator OS; FIG. 4(b) shows a voltage waveform generated by the error amplifier A2, i.e., a voltage waveform occurring at the point P1; FIG. 4(c) illustrates a voltage waveform occurring at a point P2 in the pulse-width modulator 4; FIG. 4(d) indicates a collector current waveform of the drive transistor Q3; FIG. 4(e) shows a collector current waveform of the drive transistor Q4; FIG. 4(f) illustrates a current waveform which flows through the primary winding L11 of the main transformer T1; and FIG. 4(g) shows a magnetic flux density occurring in the core of the main transformer 1. The abscissa represents time t.

Figure 5:
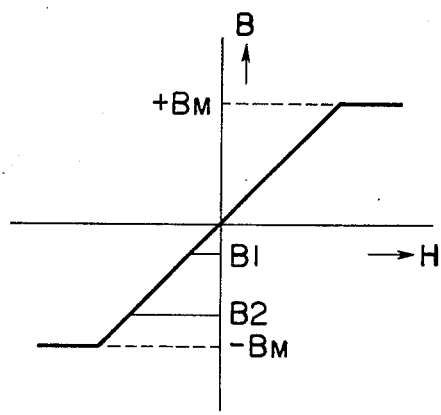
FIG. 5 is a view illustrating the magnetization characteristic of the core of a main transformer.

FIG. 5 illustrates the magnetization characteristic of the core of the main transformer T1, which is shown as including no hysteresis for the sake of simplicity. The abscissa represents magnetic flied H resulting from the current flowing through the primary winding L11.

Figure 6:
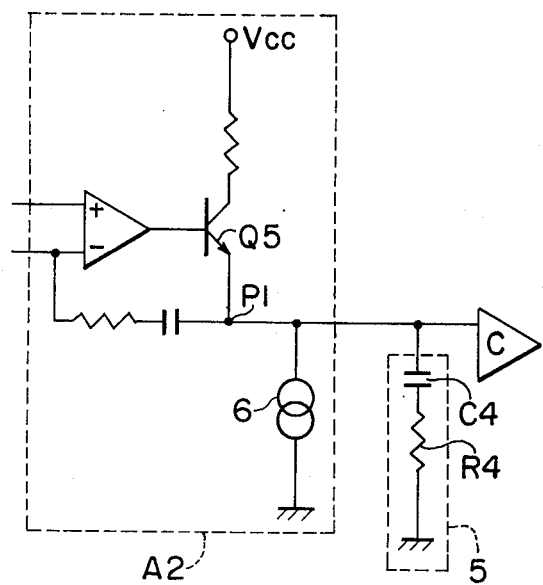
FIG. 6 is a diagram showing part of the circuit shown in FIG. 3.

Referring to FIG. 6, there is shown a circuit diagram of the output portion of the error amplifier A2, wherein when a transistor Q2 connected in an emitter-follower configuration is turned on, a constant voltage $V_{cc}$ makes it possible to cause a current to flow through the transistor as collector current which is several ten times as high as the current of a constant current source 6 connected to the emitter of the transistor.

As will be appreciated, the switching regulator according to the embodiment of the present invention as illustrated in FIG. 3 operates substantially in the same manner as that in which the conventional one described in connection with FIG. 1 operates. As will be seen from FIG. 4, prior to a point of time t0 when the load is rapidly increased, the transistors Q1 and Q2 are alternately turned on and off so that proper pulse-width control can be achieved. The magnetic flux density B in the core of the main transformer varies in such a range that no maximum magnetic flux density $\pm B_M$ is reached. FIG. 4 is similar in these points to FIG. 2.

If the load is rapidly increased at the point of time t0, then the error amplifier A2 will tend to turn off transistor Q5 so that the voltage at the point P1, i.e., the voltage generated by the error amplifier A2 will tend to become lower, whereby the width of a pulse voltage occurring at the point P2 in the pulse-width modulator 4 will tend to be increased. However, the voltage at the point P1 will be prevented from being rapidly increased, by virtue of the fact that the capacitor C of the time-constant circuit 5 is discharged. A plurality of voltage pulses will occur at the point P2 before the voltage at the point P1 reaches a constant level at a point of time t11. Moreover, the direction of the current flowing through the primary winding L11 of the main transformer T1 will also be changed to be either the positive (+) direction or the negative (−) direction, depending on the number of the voltage pulses occurring at the point P2. In FIG. 4, the current direction is changed once during the period from the point of time t0 to the point of time t11, and the direction in which the magnetic flux density B in the core of the main transformer T1 varies is also changed in a similar manner. In addition, the width of the voltage pulse occurring at the point P2 will be progressively increased, as a result of which the quantity of variation in the magnetic flux density B in the core will also be increased which is caused by the current flowing through the primary winding L11 in response to the pulse voltage at the point P2. Thus, the value of the magnetic flux density B when magnetization is effected in the same direction will also be progressively increased.

In FIG. 4, it will be seen that the magnetic flux density B in the negative (−) direction, for example, is progressively increased as indicated at B1, B2. Equivalently, this implies that the quantity of variation in the magnetic flux density B in the opposite direction is increased which is permissible between the maximum magnetic flux densities $+B_M$ and $-B_M$.

Figure 2:
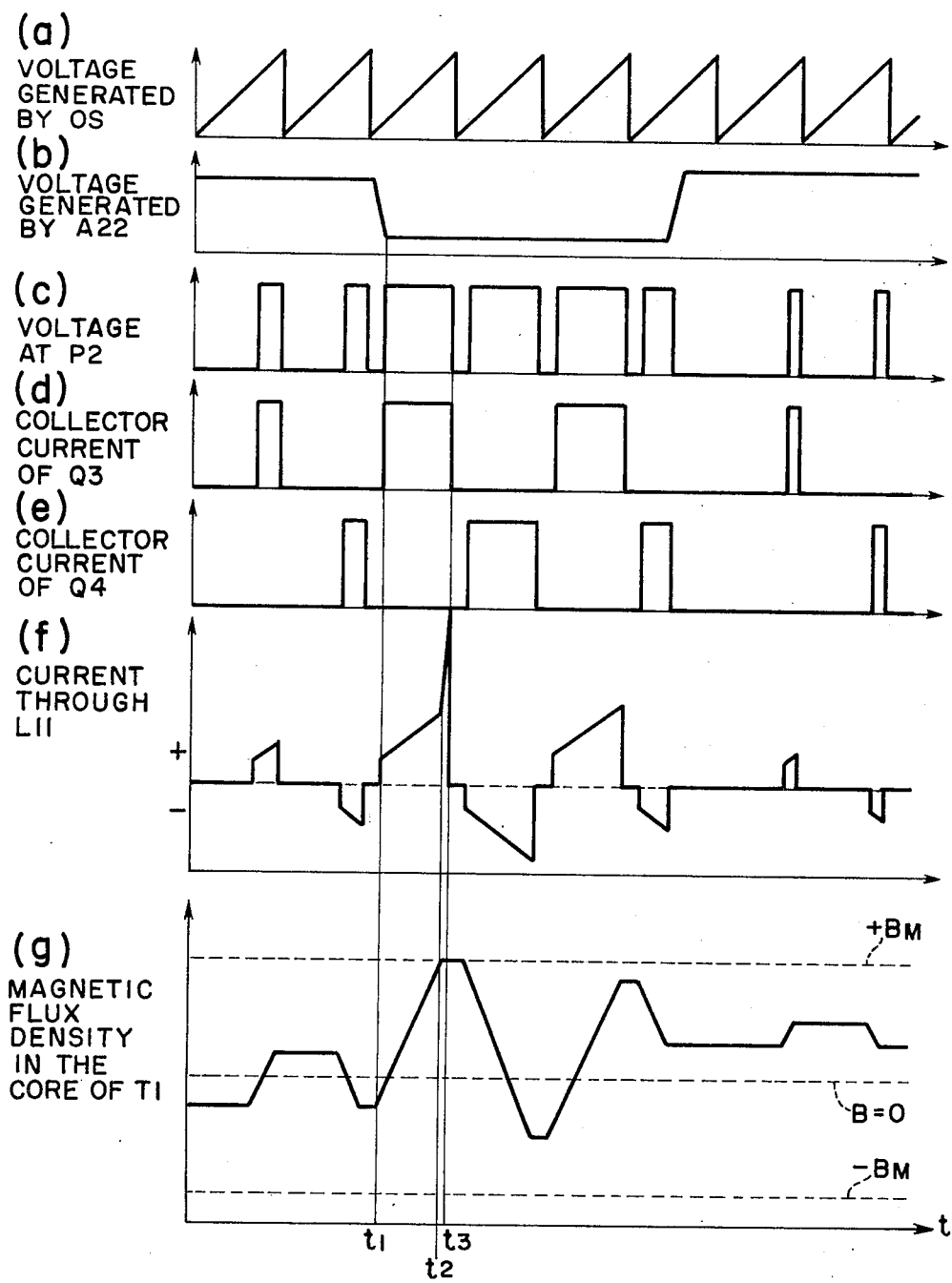
FIG. 2 is a view illustrating operating waveforms occurring at various points in the switching regulator shown in FIG. 1.

Thus, at the point of time t11 when the maximum width of the voltage pulse at the point P2 begins to occur, the permissible quantity of variation in the magnetic flux density B will also become maximum, so that even if a pulse voltage having the same width as that between the points of time t1 and t3 in FIG. 2 should occur between the points of time t11 and t12, the magnetic flux density B in the core could effectively be prevented from reaching the maximum magnetic flux density $+B_M$.

This will readily be appreciated from the fact that in the switching regulator according to the present invention, the magnetic flux density in the core is increased from a level $-B_2$, as in FIG. 5 showing the magnetization characteristic of the core, in the positive (+) direction, while in the switching regulator of FIG. 1, the magnetic flux density in the core is increased approximately from a level $-B_1$ in the positive (+) direction.

On the other hand, if the load is decreased, then the transistor Q5 will be turned on, and a collector current, which is high compared with the current of the current source 6, will be caused to flow therethrough by the constant voltage $V_{cc}$; thus, the voltage at the point P1 will rapidly build up with no substantial delay in response.

As will be appreciated from the foregoing discussion, according to the present invention, the time-constant circuit 5 is connected between the error amplifier A2 and the comparator C of the pulse-width modulator 4, whereby the voltage of the error amplifier A2 which is applied to the pulse-width modulator 4 in accordance with the value of a detected output voltage is delayed in variation in the decreasing direction. Furthermore, when the load is rapidly increased so as to cause an increased current to flow through the primary winding L11 of the main transformer T1, the magnetization of the core in a direction opposite to that of the magnetization due to the increased current is increased to prevent the core from being magnetically saturated, thereby making it possible to prevent the switching transistors from being damaged. It is to be understood that the present invention is by no means limited to the half-bridge type like the aforementioned embodiment but equally applicable to various other types of switching regulator such as, for example, full-bridge type, push-pull type and so forth. In the illustrated embodiment of the present invention, only one example of the logic for each of the pulse-width modulator 4 and error amplifier A2 was shown just for the sake of convenience.

Although, in the foregoing, description has been made of the case where the width of the voltage pulse occurring at the point P2 and the pulse width of the base input to each of the pair of transistors Q1 and Q2 are increased due to a decreasing variation in the voltage derived from the error amplifier A2, the present invention is also applicable in the case of another type of logic that the pulse width is increased due to an increasing variation in the voltage derived from the error amplifier A2, and in such a case, the design is made such that the increase in the pulse width is moderated with respect to the increase in the voltage of the error amplifier A2.

While the present invention has been illustrated and described in connection with specific embodiments thereof, it is to be understood that the present invention is by no means limited thereto but covers all changes and modifications which will become possible without departing from the scope of the appended claims.

What we claimed is:

1. A switching regulator of the type wherein a pair of transistors are alternately turned on and off by a base input applied thereto so that a current which is alternately reversed in direction is caused to flow through a primary winding of a main transformer; and a voltage induced in a secondary winding of the main transformer is rectified to obtain a DC output; and the pulse width of said base input is controlled in accordance with the magnitude of a detected output voltage by means of a pulse-width modulator to maintain the output voltage constant, characterized in that said pulse-width modulator is provided, by an error amplifier, with an input corresponding to the magnitude of said detected output voltage; and variations in the input applied to the pulse-width modulator for increasing the pulse width of said base input are moderated by means of a time-constant circuit and a circuit for causing said time-constant circuit to be charged and discharged.

2. A switching regulator of the type wherein a pair of transistors are alternately turned on and off by a base input applied thereto so that a current which is alternately reversed in direction is caused to flow through a primary winding of a main transformer; a voltage induced in a secondary winding of the main transformer is rectified to obtain a DC output; and the pulse width of said base input is controlled in accordance with the magnitude of a detected output voltage by means of a pulse-width modulator to maintain the output voltage constant, characterized in that said pulse-width modulator is provided, by an error amplifier, with an input corresponding to the magnitude of said detected output voltage; and variations in the input applied to the pulse-width modulator for increasing the pulse width of said base input are moderated by means of an emitter-follower circuit connected to the input portion of said pulse-width modulator, a constant current circuit, and a time-constant circuit.

3. A switching regulator according to claim 2, wherein said time-constant circuit comprises a series connection of a capacitor and resistor; and said emitter-follower circuit constitutes the output circuit of said error amplifier.

* * * * *